United States Patent [19]

Kuriyama et al.

[11] Patent Number: 5,079,298
[45] Date of Patent: Jan. 7, 1992

[54] SILICON-CONTAINING POLYMER HAVING COMB-SHAPE STRUCTURE

[75] Inventors: Akira Kuriyama, Higashiosaka; Toshio Kadowaki; Osami Deguchi, both of Amagasaki, all of Japan

[73] Assignee: Sunstar Giken Kabushiki Kaisha, Osaka, Japan

[21] Appl. No.: 296,305

[22] Filed: Jan. 9, 1989

Related U.S. Application Data

[63] Continuation of Ser. No. 109,838, Oct. 14, 1987, abandoned, which is a continuation-in-part of Ser. No. 869,908, Jun. 3, 1986, abandoned.

Foreign Application Priority Data

Jun. 11, 1985 [JP] Japan .................. 60-126724
Jun. 29, 1985 [JP] Japan .................. 60-143341

[51] Int. Cl.$^5$ .................. C08L 83/06; C08F 283/12
[52] U.S. Cl. .................. 525/100; 525/102; 525/479; 526/194
[58] Field of Search .................. 525/100, 102, 479; 526/194

[56] References Cited

U.S. PATENT DOCUMENTS

| | | | |
|---|---|---|---|
| 3,440,302 | 4/1969 | Speier et al. | 525/102 |
| 3,655,633 | 4/1972 | Saam | 526/194 |
| 3,829,527 | 8/1974 | Lengnick | 525/479 |
| 3,928,255 | 12/1975 | Milkovich et al. | 525/271 |
| 4,070,414 | 1/1978 | Falender et al. | 525/479 |
| 4,146,697 | 3/1979 | White | |
| 4,652,610 | 3/1987 | Dowbenko et al. | 525/100 |

FOREIGN PATENT DOCUMENTS

| | | |
|---|---|---|
| 1795389 | 3/1973 | Fed. Rep. of Germany . |
| 2105984 | 4/1972 | France . |
| 2360617 | 3/1978 | France . |
| 46-9355 | 9/1971 | Japan .................. 525/102 |
| 620693 | 6/1946 | United Kingdom . |
| 1199776 | 6/1967 | United Kingdom . |

Primary Examiner—John C. Bleutge
Assistant Examiner—Vasu S. Jagannathan
Attorney, Agent, or Firm—Wegner, Cantor, Mueller & Player

[57] ABSTRACT

A silicon-containing polymer having comb-shape structure comprising a unit of an organopolysiloxane as the main chain and a vinyl polymer as the side chain of the following formula:

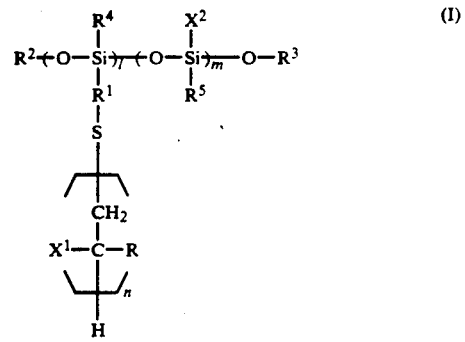

wherein $R^1$ is $C_{1-4}$ alkylene, $R^2$, $R^3$ and $R^4$ are each $C_{1-4}$ alkyl, R is H or methyl, $X^1$ is hydroxycarbonyl, $C_{2-5}$ alkoxycarbonyl, $C_{3-8}$ cycloalkyl-oxycarbonyl or phenyl, n is 1–100,000, $R^5$ is $C_{1-4}$ alkyl or phenyl, $X^2$ is H, $C_{1-4}$ alkyl, phenyl, chlorine, $C_{1-4}$ alkoxysilyl, or $C_{1-4}$ alkyl which is substituted by one to three of —NH$_2$, —NH—, —SH, —CN or F, l is 2–20, m is 0 or 1–10, which has excellent migration property and is useful as agents for giving water-repellency, adhesion, surface activity, etc. in paints or other compositions, and an intermediate macromonomer, and process for the production thereof.

4 Claims, No Drawings

SILICON-CONTAINING POLYMER HAVING COMB-SHAPE STRUCTURE

This application is a continuation of application Ser. No. 109,838filed Oct. 14, 1987, now abandoned, which is a continuation-in-part application of application Ser. No. 869,908filed June 3, 1986, now abandoned.

This invention relates to a novel silicon-containing polymer having comb-shape structure and an intermediate thereof, and a process for the production thereof. More particularly, it relates to a silicon-containing polymer having comb-shape structure comprising a unit of an organopolysiloxane as the main chain and a vinyl polymer as the side chain of the following formula:

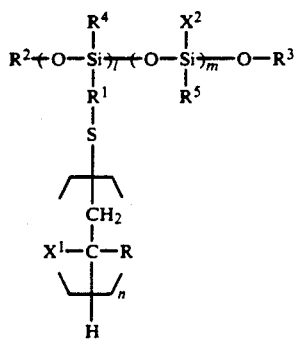

(I)

wherein $R^1$ is an alkylene having 1 to 4 carbon atoms, $R^2$, $R^3$ and $R^4$ are the same or different and are each an alkyl having 1 to 4 carbon atoms, R is hydrogen atom or methyl, $X^1$ is hydroxycarbonyl, an alkoxycarbonyl having 2 to 5 carbon atoms, a cycloalkyloxycarbonyl having 3 to 8 carbon atoms in the cycloalkyl moiety or phenyl, n is 1 to 100,000, $R^5$ is hydrogen or an alkyl having 1 to 4 carbon atoms or phenyl, $X^2$ is hydrogen atom, an alkyl having 1 to 4 carbon atoms, phenyl, chlorine, an alkoxysilyl having 1 to 4 carbon atoms in the alkoxy moiety, or an alkyl having 1 to 4 carbon atoms and containing one to three groups selected from —NH$_2$, —NH—, —SH, —CN and fluorine, l is 2 to 20, preferably 2 to 10, and m is 0 or 1 to 10, preferably 1 to 10, which has migration property and can give water-repellency and adhesion when applied to a surface and an intermediate for producing the comb-shaped polymer, i.e. an alkoxysilyl group-containing polycondensable macromonomer of the following formula

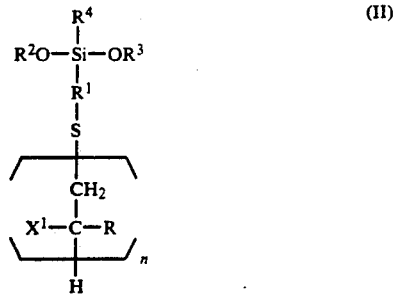

(II)

wherein R, $R^1$, $R^2$, $R^3$, $R^4$, $X^1$ and n are as defined above, and a process for the production thereof.

PRIOR ART

Recently, there have been produced various types of polymers having various functions. Among these, there are known some polymers having migration property, such as block polymers, graft polymers and comb-shaped polymers. For example, there are disclosed silicone graft polymers produced by polycondensing a silicone compound of the formula:

(A)

wherein $R^{1'}$ and $R^{2'}$ are monovalent aliphatic hydrocarbon having 1 to 10 carbon atoms, phenyl or a monovalent halogenated hydrocabon, and n is an integer of 1 or more, with an acrylic compound of the formula:

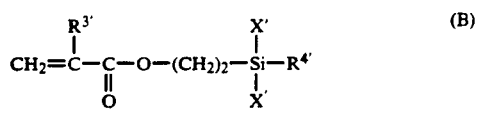

(B)

wherein $R^{3'}$ is hydrogen atom or methyl, $R^{4'}$ is methyl, ethyl, or phenyl, and X' is chlorine atom, methoxy or ethoxy, and graft-copolymerzing the resulting acrylic modified silicone with a radical copolymerizable monomer, which are useful for the preparation of a coating composition which can give a coating film having excellent water-repellency, stain resistance, and low friction (cf. Japanese Patent First Publication Nos. 154766/1983 and 167606/1983). There are also known vinyl polymerizable straight chain silicone oligomer of the formula:

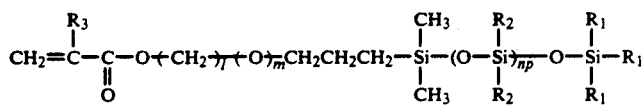

wherein $R_1$ is an alkyl having 1 to 4 carbon atoms, $R_2$ is methyl, ethyl or phenyl, $R_3$ is hydrogen atom or methyl, m is 0 or 1, l is an integer of 0-2 in case of m=0, or l is 2 in case of m=1, n is a positive integer, and p is 3 or 4, which is useful as a surface treating agent for materials such as glass and can give water-repellency, stain resistance, non-adhesion, heat resistance, and friction resistance (cf. Japanese Patent First Publication No. 78236/1984). These polymers are, however, hardly obtainable in view of low yield, complicated multiple reaction steps, and/or high cost.

BRIEF SUMMARY OF THE INVENTION

The present inventors have intensively studied to obtain a novel polymer having excellent migration property easily and with low cost, and have found that a novel silicon-containing polymer having a comb-shape structure which comprises an organopolysiloxane as the main chain and a vinyl polymer as the side chain has desirable excellent properties and can be produced by polymerizing a vinyl monomer by using a mercaptosilane compound containing a dialkoxysilyl group as a chain transfer agent to obtain a polycondensable macromonomer containing a dialkoxysilyl group at the terminus and polycondensing the resulting macromonomer alone or together with a specific dialkoxysilane compound.

An object of the invention is to provide a novel silicon-containing comb-shaped polymer having migration property and being capable of giving water-repellency and adhesion when applied to. Another object of the invention is to provide an intermediate alkoxysilyl group-containing polycondensable macromonomer suitable for production of said comb-shaped polymer. A further object of the invention is to provide a process for the production of the comb-shaped polymer and intermediate thereof. These and other objects and advantages of the invention will be apparent to those skilled in the art from the following description.

DETAILED DESCRIPTION OF THE INVENTION

The silicon-containing comb-shaped polymer comprising a unit of the formula (I) of the invention can be produced by polymerizing a vinyl monomer of the formula:

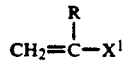

(III)

wherein R and $X^1$ are as defined above, by using a mercaptosilane compound of the formula:

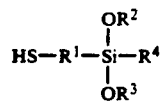

(IV)

wherein $R^1$, $R^2$, $R^3$ and $R^4$ are as defined above as a chain transfer agent optionally in the presence of a radical initiator to obtain an intermediate macromonomer of the formula (II) which has a dialkoxysilyl group at the terminus, and polycondensing the intermediate macromonomer (II) alone or together with a dialkoxysilane compound of the formula:

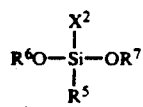

(V)

wherein $R^5$ and $X^2$ are as defined above, and $R^6$ and $R^7$ are the same or different and are each an alkyl having 1 to 4 carbon atoms, optionally in the presence of a polycondensation catalyst.

The mercaptosilane compound (IV) used as the chain transfer agent in the invention includes, for example, mercaptomethyl-methyldimethoxysilane, mercaptomethyl-methyldiethoxysilane, mercaptomethyl-ethyldimethoxysilane, mercaptomethyl-ethyldiethoxysilane, 2-mercaptoethyl-methyldimethoxysilane, 2-mercaptoethyl-methyldiethoxysilane, 2-mercaptoethyl-ethyldimethoxysilane, 2-mercaptoethyl-ethyldiethoxysilane, 3-mercaptopropyl-methyldimethoxysilane, 3-mercaptopropyl-methyldiethoxysilane, 3-mercaptopropylethyldimethoxysilane, 3-mercaptopropyl-ethyldiethoxysilane, 4-mercaptobutylmethyldimethoxysilane, 4-mercaptobutylmethyldiethoxysilane, 4-mercaptobutylethyldimethoxysilane, 4-mercaptobutyl-ethyldiethoxysilane, and the like. These may be used alone or in combination of two or more thereof. The mercaptosilane compound (IV) is used in an appropriate amount depending on the molecular weight of the final comb-shaped polymer, but is usually used in an amount of 0.01 to 5 parts by weight to 100 parts by weight of the vinyl monomer.

The vinyl monomer used in the invention includes all conventional monomers having vinyl, vinylene and/or vinylidene groups, for example, $C_{1-12}$ alkyl acrylates (e.g. methyl acrylate, ethyl acrylate, propyl acrylate, n-butyl acrylate, isobutyl acrylate, amyl acrylate, hexyl acrylate, 2-ethylhexyl acrylate, n-octyl acrylate, etc.), $C_{5-7}$ cycloalkyl acrylates (e.g. cyclohexyl acrylate, etc.), hydroxy($C_{1-4}$) alkyl acrylates (e.g. glycidyl acrylate, 2-hydroxyethyl acrylate, 2-hydroxypropyl acrylate, etc.), $C_{1-12}$ alkyl methacrylates (e.g. methyl methacrylate, ethyl methacrylate, n-butyl methacylate, isobutyl methacrylate, 2-ethylhexyl methacrylate, lauryl methacrylate, tridecyl methacrylate, etc.), phenyl-($C_{1-3}$) alkyl methacrylates (e.g. benzyl methacrylate, etc.), $C_{5-7}$ cycloalkyl methacrylates (e.g. cyclohexyl methacrylate, etc.), tetrahydrofurfuryl methacrylate, hydroxy-($C_{1-4}$) alkyl methacrylates (e.g. 2-hydrxoyethyl methacrylate, 2-hydroxypropyl methacrylate, glycidyl methacrylate, etc.), $C_{1-2}$ alkoxy-$C_{1-4}$ alkyl methacylates (e.g. 2-methoxyethyl methacrylate, 2-ethoxyethyl methacrylate, etc.), halogeno-$C_{1-10}$ alkyl acrylates or methacylates (e.g. 2,2,3,3-tetrafluoropropyl acrylate, octafluoropentyl acrylate, octafluoropentyl methacrylate, etc.), styrene, and the like. There may also be used other vinyl monomers, such as maleic anhydride, vinylacetic acid, 4-methacryloxyethyltrimellitic anhydride (4-META), acid phosphoxyethyl methacrylate, methacrylic acid, acrylic acid, vinyl propionate, vinyl versatate (Veoba, manufactured by Shell Oil), vinyl chloride, acrylonitrile, acrylamide, N-methylolacrylamide, vinylpyridine, vinylpyrrolidone, butadiene, and the like. These other vinyl monomers may be used alone or in combination thereof instead of or together with the vinyl monomers of the formula (III).

The dialkoxysilane compound (V) which is optionally used in this invention is used for improving the properties (e.g. adhesion) of the final comb-shaped polymer by introducing a functional group into the main chain thereof. The dialkoxysilane compound includes, for example, N-(2-aminoethyl)-3-aminopropyl-methyldimethoxysilane, 3-aminopropyl-methyldiethoxysilane, chloromethyl-methyldimethoxysilane, 3-chloropropyl-methyldimethoxysilane, 2-cyanoethyl-methyldiethoxysilane, diethyl-diethoxysilane, dimethyl-diethoxysilane, diphenyl-diethoxysilane, diphenyldimethoxysilane, 3-mercaptopropyl-methyldimethoxysilane, methyldiethoxysilane, methyldimethoxychlorosilane, methyldimethoxysilane, methyldodecyldiethoxysilane, methyloctadecyldiethoxysilane, methylphenyldiethoxysilane, methylphenyldimethoxysilane, (3,3,3-trifluoropropyl)methyldiethoxysilane, vinylmethyldiacetoxysilane, vinylmethyldiethoxysilane, and the like. Moreover, 1,1,4,4-tetramethyl-1,4-diethoxysilylethylene, 1,1,3,3-tetramethyl-1,3-diethoxydisiloxane, and the like are also usable. These compounds may be used alone or in combination thereof. The dialkoxysilane compound (V) is usually used in an amount of 0.01 to 5 parts by weight to 100 parts by weight of the macromonomer (II). In order to improve the water-repellency of the product, dialkyldialkoxysilanes are preferably used, and in order to improve the adhesion of the product, dialkoxysilanes containing a group suitable for giving adhesion (e.g. $-NH_2$, $-SH$, etc.) are preferably used.

Thus, the comb-shaped polymer comprising the unit of the formula (I) includes both of the product produced by using the dialkoxysilane compound (V) and the product produced without using the dialkoxysilane compound. The process for the production thereof is explained in more detail below.

(i) The vinyl monomer (III) is admixed with a fixed amount of the mercaptosilane compound (IV), and the mixture is subjected to heat polymerization or photopolymerization in the presence of, optionally, a radical initiator. The polymerization reaction may also be carried out by a solution polymerization using a suitable solvent or without using any solvent, but it is not preferable to do by emulsion polymerization or suspension polymerization where water is co-present, because the alkoxysilyl group in the mercaptosilane compound (IV) is hydrolyzed by water.

The radical initiator used in the above reaction is usually used in an amount of 0.005 to 0.1 part by weight to 100 parts by weight of the vinyl monomer (III). The radical initiator includes, for example, 2,2'-azobisisobutyronitrile (AIBN), 2,2'-azobisisovaleronitrile, 2,2'-azobis(2,4-dimethylvaleronitrile), benzoyl peroxide (BPO), t-butyric peroxide, methyl ethyl ketone peroxide, and the like. There may also be used a combination of a Redox catalyst (transition metal salt, amine, etc.) with a peroxide radical initiator which is usually used in Redox polymerization. In case of photopolymerization, the radical initiator is not necessarily required.

By the polymerization of the vinyl monomer (III) and the mercaptosilane compound (IV), there is produced the desired intermediate macromonomer (II) having a dialkoxysilyl group at the terminus. When BPO is used as the radical initiator, the hydrolyzate in the radical polymerization, i.e. benzoic acid functions as a catalyst, and hence, the polycondensation reaction as mentioned below proceeds in the presence of water to give directly the desired comb-shaped polymer in one step.

(ii) Subsequently, the macromonomer (II) obtained in the above step (i) is subjected to polycondensation reaction alone or together with a dialkoxysilane compound (V) in the presence of a polycondensation catalyst. The polycondensation reaction is usually carried out at a temperature of from room temperature to 80° C. for 5 to 48 hours. The polycondensation catalyst includes, for example, titanates (e.g. tetrabutyl titanate, tetrapropyl titanate, etc.), organic tin compounds (e.g. dibutyl tin dilaurate, dibutyl tin maleate, tin octate, tin naphthenate, n-butyl tin oxide, etc.), lead octate, amine compounds (e.g. butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 1,3-diazabicyclo[5.4.6]undecene-7 (DBU), and carboxylic acid salts of these amine compounds. These compounds may be used alone or in combination of two or more thereof. The catalyst is usually used in an amount of 0.01 to 1 part by weight to 100 parts by weight of the macromonomer (II).

In the above polycondensation reaction, the reaction system become viscous in case of solution polymerization, and then, the solvent is removed in a usual manner to give the desired comb-shaped polymer as a solid substance at room temperature or as a highly viscous oily substance. In case of using butyl acrylate as the vinyl monomer, the comb-shaped polymer is obtained as a highly viscous substance having a low glass transition temperature, but in other cases, the polymer is obtained as a glass-like white powdery solid substance.

The comb-shaped polymer of this invention can easily be produced by a comparatively simple two step reaction (even by single step under a certain condition as mentioned above). Besides, the polymer has excellent migration property and hence can give improvement of properties (e.g. stain resistance) of surface or interface of substances to which the polymer is applied even in a small amount. Moreover, the comb-shaped polymer having a functional group of a dialkoxysilane compound (V) in the main chain shows excellent properties such as water-repellency, adhesion, etc. Owing to the excellent properties, the comb-shaped polymer of this invention is useful as an agent for giving water-repellency to paints, an agent for giving adhesion (particularly suitable for applying to glass or glass made materials), a releasing agent, and further an agent for giving surface activity.

The invention is illustrated by the following Examples.

EXAMPLE 1

(1) Methyl methacrylate (MMA) (50 g), 3-mercaptopropyl-methyldimethoxysilane (0.9 g), AIBN (0.08 g) and toluene (25 g) are charged into a glass-made polymerization vessel, and the vessel is cooled, de-aerated, and then sealed. The vessel is shaken in water bath at 60° C. to proceed the polymerization reaction. After polymerizing for 8 hours, there is obtained a high viscous polymer solution in toluene. The yield of the polymer is 96% (calculated by gravimetric analysis: 105° C., 4 hours). It is confirmed that the polymer thus obtained is polymethyl methacrylate by the analysis with IR spectrometer (manufactured by Nippon Bunko K. K.). Besides, this polymer has a number average molecular weight of $9.8 \times 10^3$, which is measured by gel permeation chromatography (GPC).

(2) To a solution of polymethyl methacrylate in toluene obtained in the above (1) (100 parts by weight) is added dibutyl tin laurate (0.5 part by weight), and the mixture is spreaded on a dish in a layer as thin as possible and allowed to stand at room temperature for 7 days, by which the solvent toluene is evaporated to give a film of solid polymer. A part of the film is dissolved in tetrahydrofuran, and the molecular weight of the polymer is measured by GPC like in the above (1), by which it is confirmed that this polymer has a number average molecular weight of $4.5 \times 10^4$ and that it is a comb-shaped polymer of the following formula:

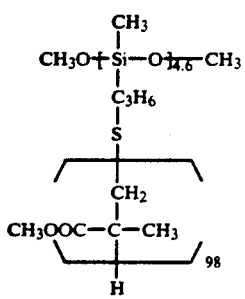

(3) To a solution of polymethyl methacrylate in toluene obtained in the above (1) (100 parts by weight) are added dimethyldiethoxysilane (2 parts by weight), de-ionized water (5 parts by weight) and n-butyl tin oxide (0.5 part by weight), and the mixture is stirred at 60° C. for 8 hours, by which the mixture shows increased viscosity. The molecular weight thereof is measured by GPC likewise and it is confirmed that the product has a polymer having a number average molecular weight of $7.8 \times 10^4$, and thereby, that the product is a comb-shaped polymer comprising a unit consisting of an organopolysilaxane as the main chain and a polymethyl methacrylate having a number average molecular weight of $9.8 \times 10^3$ as the side chain.

EXAMPLE 2

(1) Butyl acrylate (BA) (10 g) and 3-mercaptopropyl-methyldimethoxysilane (0.5 g) are charged into a glass-made polymerization vessel, and the vessel is cooled, de-aerated, and then sealed. The vessel is entered in water bath at 15° C., and a UV light is irradiated at a distance of 10 cm with a UV irradiation device (SHL-100, manufactured by Toshiba, Japan) to proceed the photopolymerization reaction. After polymerizing for 10 hours, the resulting reaction mixture is taken out. The yield of the polymer is 95% (calculated by gravimetric analysis). This polymer has a number average molecular weight of $4.5 \times 10^3$ which is measured by GPC. (2) To the polymer (100 parts by weight) are added methyldimethoxysilane (5 parts by weight), n-butyl tin oxide (0.5 part by weight) and a small amount of deionized water. After dispersing well water, the mixture is allowed to stand at 80° C. for 1 day. The resulting polymer has a number average molecular weight of $3.8 \times 10^4$ when measured by GPC, and thereby it is confirmed that it is a comb-shaped polymer of the following formula:

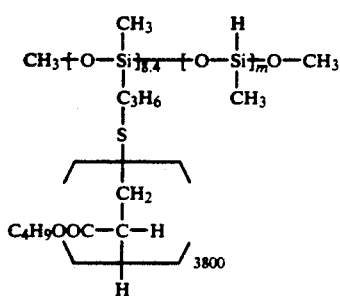

This comb-shaped polymer shows high adhesion to a surface of glass.

EXAMPLE 3

MMA (8 g), octafluoropentyl methacrylate (2 g), 3-mercaptopropyl-methyldimethoxysilane (0.01 g), toluene (2 g) and AIBN (0.01 g) are subjected to polymerization reaction at 60° C. for 8 hours to give a copolymer resin. The resin is mixed with n-butyl tin oxide (0.05 g), and the mixture is applied onto a surface of glass plate and is allowed to stand at room temperature for 7 days. As the result, the product (comb-shaped polymer) shows excellent water-repellency and also oil-repellency.

EXAMPLES 4 TO 27

In the same manner as described in Example 1 (1) (heat polymerization, at 60° C.), in Example 2 (1) (photopolymerization) and in Example 1 (2) (polycondensation) except that the ingredients as shown in Table 1 are used, there are produced various comb-shaped polymers. In all Examples, the used chain transfer agent is 3-mercaptopropyl-methyldimethoxysilane.

TABLE 1

| Ex. No. | Vinyl monomer (g) | Chain transfer agent (g) | AIBN (g) | Toluene (g) | Heat or Photopolymerization |
|---|---|---|---|---|---|
| 4 | MMA(50) | 1.8 | 0.16 | 25 | Heat |
| 5 | BA(50) | 0.5 | — | — | Photo |
| 6 | BA(10), GA(1) | 0.5 | — | — | Photo |
| 7 | EA(10) | 0.5 | — | — | Photo |
| 8 | EA(10), GA(1) | 0.5 | — | — | Photo |
| 9 | St(10), MAn(0.5) | 0.3 | 0.01 | 2 | Heat |
| 10 | ST(10), 4META(0.3) | 0.3 | 0.01 | 2 | Heat |
| 11 | MMA(10), MAn(0.5) | 0.3 | 0.01 | 2 | Heat |
| 12 | MMA(10), 4META(0.3) | 0.3 | 0.01 | 2 | Heat |
| 13 | EA(10), MAn(0.3) | 0.3 | 0.01 | 2 | Heat |
| 14 | EA(10), 4META(0.3) | 0.3 | 0.01 | 2 | Heat |
| 15 | MMA(9), Biscoat 4F(1) | 0.3 | 0.01 | 2 | Heat |
| 16 | MMA(8), Biscoat 4F(1) | 0.3 | 0.01 | 2 | Heat |
| 17 | MMA(9), Biscoat 8F(1) | 0.3 | 0.01 | 2 | Heat |
| 18 | MMA(8), Biscoat 8F(1) | 0.3 | 0.01 | 2 | Heat |
| 19 | MMA(8), Biscoat 8MF(2) | 0.3 | 0.01 | 2 | Heat |
| 20 | Biscoat 4F(5) | 0.1 | 0.005 | — | Heat |
| 21 | Biscoat 8F(5) | 0.1 | 0.005 | — | Heat |
| 22 | Biscoat 8MF(5) | 0.1 | 0.005 | — | Heat |
| 23 | VAc(10) | 0.1 | 0.01 | — | Heat |
| 24 | VAc(8), MMA(2) | 0.1 | 0.01 | — | Heat |
| 25 | VAc(5), MMA(5) | 0.1 | 0.01 | — | Heat |
| 26 | VAc(2), MMA(8) | 0.1 | 0.01 | — | Heat |
| 27 | GMA(10) | 0.13 | 0.01 | — | Heat |

[Note]: The abbreviations of the vinyl monomers in Table 1 mean the following compounds.
MMA: Methyl methacrylate
BA: Butyl acrylate
EA: Ethyl acrylate
GA: Glycidyl acrylate
St: Styrene
MAn: Maleic anhydride
4META: 4-Methacryloxyethyl-trimellitic anhydride
Biscoat 4F: 2,2,3,3-Tetrafluoropropyl acrylate
Biscoat 8F: Octafluoropentyl acrylate
Biscoat 8MF: Octafluoropentyl methacrylate
VAc: Vinyl acetate
GMA: Glycidyl methacrylate

EXAMPLES 28 TO 29

(1) Butyl acrylate (BA) (10 parts by weight) and 3-mercaptopropyl-methyldimethoxysilane (0.5 part by weight) are charged into a glass-made polymerization vessel, and the vessel is cooled, deaerated, and then sealed. The vessel is entered in a water bath at 15° C., and a UV light is irradiated at a distance of 10 cm with a UV irradiation device (SHL-100, manufactured by Toshiba, Japan) to proceed the photopolymerization reaction. After polymerizing for 10 hours, the resulting reaction mixture is taken out. The polymer has a number average molecular weight of $4.5 \times 10^3$ (2) To the polymer obtained above (100 parts by weight) are added 3,3,3-trifluoropropyl-methyldimethoxysilane or 3-aminopropyl-diethoxysilane (5 parts by weight), n-butyl tin oxide (0.5 part by weight) and a small amount of deionized water. After dispersing well water, the mixture is allowed to stand at 80° C. for one day to give comb-shaped polymers of the following formula:

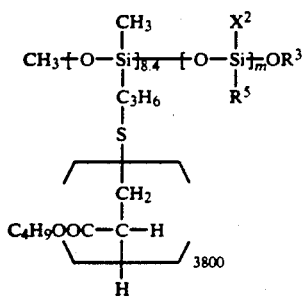

wherein (1) $X^2$ is $-CH_2CH_2CF_3$, $R^3$ is $-CH_3$, and $R^5$ is $-CH_3$, or (2) $X^2$ is $-CH_2CH_2CH_2NH_2$, $R^3$ is $-C_2H_5$, and $R^5$ $-H$.

EXPERIMENT 1

The comb-shaped polymer as prepared in Example 2 and that in Example 28 ($X^2$ is $-CH_2CH_2CF_3$) were subjected to a test of water repellency as follows.

Preparation of paint

An acrylic resin (Daikalack-5000, manufactured by Daido Kasei K. K, Japan) (75 parts by weight), titanium oxide (25 parts by weight) and the comb-shaped polymer (10 parts by weight) were mixed to give a paint.

Test

The paint thus prepared was coated onto a glass in a thickness of 0.05 mm (in wet) and dried at room temperature for three days. As to the test sample, the contact angle was measured with a goniometer. The result is shown as an initial data.

The test sample prepared by coating the paint as described above was dipped in hexane for three days, and after drying, the contact angle of the test sample was measured likewise. Besides, the test sample prepared by coating the paint likewise was dipped in water at 60° C. for one day, and after drying, the contact angle of the test sample was measured likewise.

As a control, a paint prepared as described above except that no comb-shaped polymer was used was subjected to the test likewise.

The above test results are shown in Table 2.

TABLE 2

| Example No. of comb-shaped polymer | Contact angle | | |
|---|---|---|---|
| | Initial | After dipping in hexane | After dipping in water |
| Control | 80 | 80 | 83 |
| Example 2 | 85 | 85 | 85 |

TABLE 2-continued

| Example No. of comb-shaped polymer | Contact angle | | |
|---|---|---|---|
| | Initial | After dipping in hexane | After dipping in water |
| Example 28 | 83 | 77 | 87 |

EXPERIMENT 2

The comb-shaped polymer as prepared in Example 29 ($X^2$ is $-CH_2CH_2CH_2NH_2$) was subjected to an adhesion test as follows.

A paint prepared in the same manner as described in the above Experiment 1 by using the comb-shaped polymer of Example 29 was coated on a steel plate in a thickness of 0.05 mm (in wet) and dried at room temperature for three days.

The coated steel plate was crosscut in 100 areas (each area size: 1 mm $\times$ 1 mm), and thereon a cellophane tape was adhered, and immediately the tape was peeled. The number of area peeled off together with the tape was counted. The data are shown as the initial data.

A coated steel plate prepared likewise was dipped in water at 60° C. for three days, and after drying, the plate was subjected to the adhesion test likewise.

As a control, the same test was repeated by using a paint prepared without using a comb-shaped polymer.

The results are shown in Table 3, wherein the data are shown by the number of remained areas/total number of crosscut areas.

TABLE 3

| Example No. of product | Initial | Dipping in water at 60° C. for three days |
|---|---|---|
| Control | 90/100 | 80/100 |
| Example 29 | 100/100 | 88/100 |

As is clear from the above experiments, the comb-shaped polymers of this invention show excellent properties such as water repellency and adhesion.

What is claimed is:

1. A process for producing a silicon-containing comb-shaped polymer comprising a unit of the formula (I):

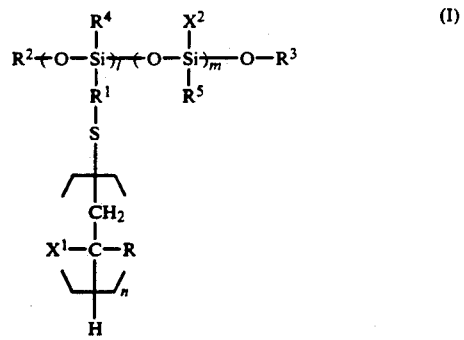

wherein $R^1$ is an alkylene having 1 to 4 carbon atoms, $R^2$, $R^3$, and $R^4$ are the same or different and are each an alkyl having 1 to 4 carbon atoms, R is hydrogen atom or methyl, $X^1$ is hydroxycarbonyl, an alkoxycarbonyl having 2 to 5 carbon atoms, a cycloalkyloxycarbonyl having 3 to 8 carbon atoms in the cycloalkyl moiety or phenyl, n is 1 to 100,000 $R^5$ is an alkyl having 1 to 4 carbon atoms or phenyl, $X^2$ is an alkyl having 1 to 4 carbon atoms and containing one to three groups selected from $-NH_2$ and fluorine, l is 2 to 20, and m is 0 to 1 to 10, which comprises polymerizing a vinyl monomer of the formula:

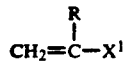  (III)

wherein R and $X^1$ as defined above by using a mercaptosilane compound of the formula:

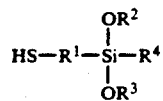  (IV)

wherein $R^1$, $R^2$, $R^3$, and $R^4$ are as defined above as a chain transfer agent in an amount of 0.01 to 5 parts by weight to 100 parts by weight of the vinyl monomer (III) to obtain a macromonomer of the following formula (II) which has a dialkoxysilyl group at the terminus:

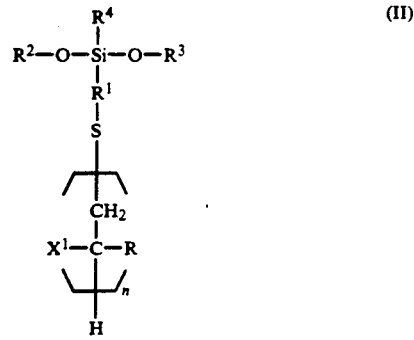  (II)

wherein R, $R^1$, $R^2$, $R^3$, $R^4$, $X^1$ and n are as defined above, and polycondensing the macromonomer (II), wherein the polycondensation of the macromonomer (II) is carried out together with a dialkoxysilane compound of the formula:

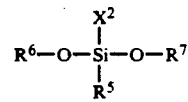

wherein $R^5$ and $X^2$ are as defined above, and $R^6$ and $R^7$ are the same or different and are each an alkyl having 1 to 4 carbon atoms.

2. The process according to claim 1, wherein the polymerization of the vinyl monomer (III) is carried out in the presence of a radical initiator.

3. The process according to claim 1, wherein the polycondensation of the macromonomer (II) is carried out in the presence of a polycondensation catalyst.

4. The process according to claim 1, wherein $X^2$ is a group selected from 3,3,3-trifluoropropyl and 3-aminopropyl.

* * * * *